United States Patent
Wu et al.

(10) Patent No.: US 12,093,297 B2
(45) Date of Patent: Sep. 17, 2024

(54) SUMMARY GENERATION MODEL TRAINING METHOD AND APPARATUS, DEVICE AND STORAGE MEDIUM

(71) Applicant: BEIJING BAIDU NETCOM SCIENCE TECHNOLOGY CO., LTD., Beijing (CN)

(72) Inventors: Wenhao Wu, Beijing (CN); Wei Li, Beijing (CN); Xinyan Xiao, Beijing (CN); Jiachen Liu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 333 days.

(21) Appl. No.: 17/577,561

(22) Filed: Jan. 18, 2022

(65) Prior Publication Data
US 2023/0004589 A1    Jan. 5, 2023

(30) Foreign Application Priority Data
Jun. 30, 2021    (CN) .......................... 202110734020.1

(51) Int. Cl.
G06F 40/56    (2020.01)
G06F 16/34    (2019.01)
G06F 40/51    (2020.01)

(52) U.S. Cl.
CPC ............ *G06F 16/345* (2019.01); *G06F 40/51* (2020.01); *G06F 40/56* (2020.01)

(58) Field of Classification Search
CPC ..... G10L 15/16; G10L 15/063; G10L 15/197; G10L 15/26; G10L 15/1815; G10L 15/18;
(Continued)

(56) References Cited

U.S. PATENT DOCUMENTS 11,347,947 B2 *    5/2022    Zhicharevich .......... G06F 40/30
2019/0287012 A1 *    9/2019    Celikyilmaz ......... G06F 16/345
(Continued)

FOREIGN PATENT DOCUMENTS

CN    108763211 A    11/2018
CN    110347819 A    10/2019
(Continued)

OTHER PUBLICATIONS

Pang Chao, et al. "Chinese Text Summarizatiob Based on Classification" Computer Science, vol. 45, No. 1, Jan. 2018, 16 Pages.
(Continued)

*Primary Examiner* — Richemond Dorvil
*Assistant Examiner* — Mulugeta Tuji Dugda
(74) *Attorney, Agent, or Firm* — Brooks Kushman P.C.

(57) ABSTRACT

The present disclosure provides a summary generation model training method and apparatus, a device and a storage medium, and relates to the field of computer technologies, and in particular, to the field of artificial intelligence such as natural language processing and deep learning. The summary generation model training method includes: acquiring a document representation corresponding to a document sample; constructing, based on the document representation, a summary representation corresponding to the document representation, the summary representation including a positive summary representation and a negative summary representation; and constructing a total contrastive loss function based on the document representation, the positive summary representation and the negative summary representation, and training a summary generation model based on the total contrastive loss function. The present disclosure may improve accuracy of the summary generation model.

9 Claims, 5 Drawing Sheets

(58) Field of Classification Search
CPC ..... G10L 25/30; G10L 15/183; G06F 16/345;
G06F 40/30; G06F 16/3344; G06F 40/40;
G06F 40/289; G06F 40/216; G06F 40/51;
G06F 40/58; G06F 40/56
See application file for complete search history.

(56) References Cited

U.S. PATENT DOCUMENTS

| | | | | |
|---|---|---|---|---|
| 2020/0272791 | A1* | 8/2020 | Jonnalagadda | G06N 5/04 |
| 2020/0279017 | A1* | 9/2020 | Norton | G06N 3/045 |
| 2021/0117617 | A1 | 4/2021 | Blaya et al. | |

FOREIGN PATENT DOCUMENTS

| | | | | |
|---|---|---|---|---|
| CN | 110427618 A | 11/2019 | | |
| CN | 111597327 A | 8/2020 | | |
| CN | 111651996 A | 9/2020 | | |
| CN | 112560479 A | 3/2021 | | |
| CN | 112732902 A | 4/2021 | | |
| CN | 112836525 A | 5/2021 | | |
| EP | 3905142 A1 * | 11/2021 | ........... | G06F 16/345 |
| JP | 2019057023 A | 4/2019 | | |
| JP | 2019083002 A | 5/2019 | | |
| WO | 2020107878 A1 | 6/2020 | | |

OTHER PUBLICATIONS

Jingjing Chen, et. al. "Text Summarization Generation Based On Semantic Similarity" 2020 International Conference on Intelligent Transportation, Big Data & Smart City (ICITBS), 4 Pages, 2020, 4 Pages.

Feng Chong, et al. "Text Summarization Method Based on Self-Interactive Attention Mechanism" Command Information System and Technology, vol. 9, No. 5, Oct. 2018, 5 Pages.

* cited by examiner

SUMMARY GENERATION MODEL TRAINING METHOD AND APPARATUS, DEVICE AND STORAGE MEDIUM

CROSS-REFERENCE TO RELATED APPLICATIONS

The present application claims the priority of Chinese Patent Application No. 202110734020.1, filed on Jun. 30, 2021, with the title of "SUMMARY GENERATION MODEL TRAINING METHOD AND APPARATUS, DEVICE AND STORAGE MEDIUM." The disclosure of the above application is incorporated herein by reference in its entirety.

TECHNICAL FIELD

The present disclosure relates to the field of computer technologies, specifically to the field of artificial intelligence such as natural language processing and deep learning, and in particular, to a summary generation model training method and apparatus, a device and a storage medium.

BACKGROUND

Automatic summarization is intended to automatically generate a concise summary for one or more documents, and the generated summary is required to be coherent in meaning, smooth in language and faithful to content of an original text. The automatic summarization may be divided into extractive summarization and generative summarization. The generative summarization is intended to understand an inputted document and organize language to generate a target summary by imitating human summarization through a big data technology. Processing of the generative summarization may include processing an inputted document by using a summary generation model, to obtain a summary corresponding to the inputted document.

In the related art, a maximum likelihood probability function is used as a loss function to train the summary generation model.

SUMMARY

The present disclosure provides a summary generation model training method and apparatus, a device and a storage medium.

According to one aspect of the present disclosure, a summary generation model training method is provided, including: acquiring a document representation corresponding to a document sample; constructing, based on the document representation, a summary representation corresponding to the document representation, the summary representation including a positive summary representation and a negative summary representation; and constructing a total contrastive loss function based on the document representation, the positive summary representation and the negative summary representation, and training a summary generation model based on the total contrastive loss function.

According to another aspect of the present disclosure, there is provided an electronic device, including: at least one processor; and a memory communicatively connected with the at least one processor; wherein the memory stores instructions executable by the at least one processor, and the instructions are executed by the at least one processor to enable the at least one processor to perform a summary generation model training method, wherein the summary generation model training method including: acquiring a document representation corresponding to a document sample; constructing, based on the document representation, a summary representation corresponding to the document representation, the summary representation including a positive summary representation and a negative summary representation; and constructing a total contrastive loss function based on the document representation, the positive summary representation and the negative summary representation, and training a summary generation model based on the total contrastive loss function.

According to another aspect of the present disclosure, there is provided a non-transitory computer readable storage medium with computer instructions stored thereon, wherein the computer instructions are used for causing a computer to perform a summary generation model training method, wherein the summary generation model training method includes: acquiring a document representation corresponding to a document sample; constructing, based on the document representation, a summary representation corresponding to the document representation, the summary representation comprising a positive summary representation and a negative summary representation; and constructing a total contrastive loss function based on the document representation, the positive summary representation and the negative summary representation, and training a summary generation model based on the total contrastive loss function.

According to the technical solutions of the present disclosure, accuracy of the summary generation model may be improved.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF THE DRAWINGS

The accompanying drawings are intended to provide a better understanding of the solutions and do not constitute a limitation on the present disclosure. In the drawings.

DETAILED DESCRIPTION

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

Figure 1:
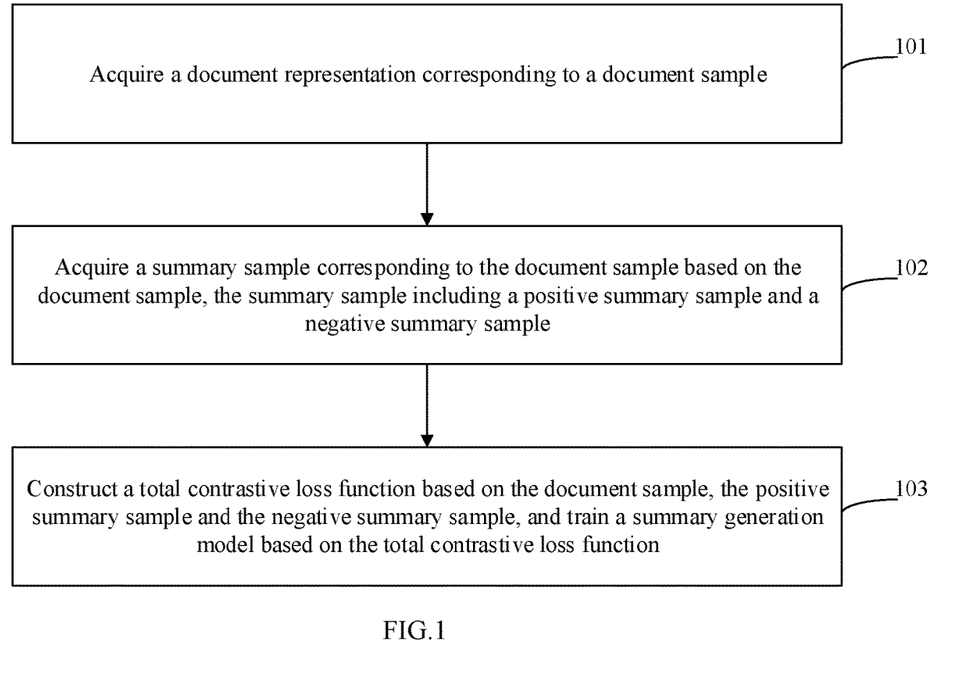
FIG. 1 is a schematic diagram of a first embodiment according to the present disclosure.

FIG. 1 is a schematic diagram of a first embodiment according to the present disclosure. This embodiment provides a summary generation model training method, including the following steps:

In 101, a document representation corresponding to a document sample is acquired.

In 102, a summary sample corresponding to the document sample is acquired based on the document sample, the summary sample including a positive summary sample and a negative summary sample.

In 103, a total contrastive loss function is constructed based on the document sample, the positive summary sample and the negative summary sample, and a summary generation model is trained based on the total contrastive loss function.

In this embodiment, the method may be performed by a summary generation model training apparatus. The training apparatus may be located in a terminal, a server or the like.

The document sample may be acquired from an existing data set. For example, through historical collection or construction, a large amount of existing data may be obtained, which may include existing documents. The existing documents are taken as document samples.

Representation is information configured to describe data. For example, a representation for pixels may be RGB data or HSV data. The representation may generally describe data in a vector form.

Figure 2:
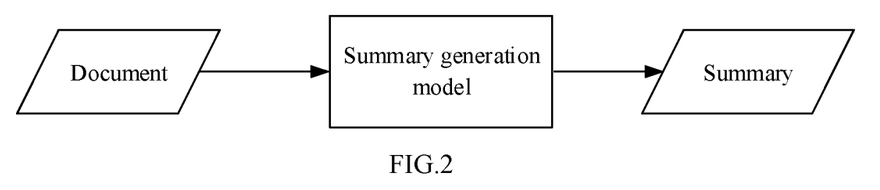
FIG. 2 is a schematic diagram of a second embodiment according to the present disclosure.

The summary generation model (hereinafter referred to as "model") refers to a model processing a document to obtain a summary corresponding to the document. For example, as shown in FIG. 2, in an application stage, a document for which a summary is to be generated is inputted to the summary generation model, and the summary generation model processes the document and outputs a summary corresponding to the document. The summary corresponding to the document refers to key information in the document. New words and phrases that are not in an original document may be generated based on the summary generated by the summary generation model.

A positive summary representation refers to a representation of the positive summary sample corresponding to the document sample. A negative summary representation refers to a representation of the negative summary sample corresponding to the document sample.

The positive summary sample refers to a summary sample semantically consistent with the document sample, while the negative summary sample refers to a summary sample semantically inconsistent with the document sample. For example, a document sample says that a movie is good. If a summary sample also says that the movie is good or semantically similar, such as awesome or Okay, the summary sample is a positive summary sample. If a summary sample says that the movie is bad, for example, awful, the summary sample is a negative summary sample.

In the related art, during the training of the summary generation model, a maximum likelihood probability function is generally used as a loss function. The maximum likelihood probability function is a 2-tuple function based on a predictive representation and a real representation of a sample. However, since the maximum likelihood function only reflects a statistical relationship and cannot accurately reflect a semantic relationship, the accuracy of the summary generation model may be affected.

In the embodiment of the present disclosure, during the training of the summary generation model, the loss function used is a contrastive loss function. The contrastive loss function is a loss function constructed based on a triple to better compare a relationship between positive and negative samples. In order to be distinguished from a subsequent contrastive loss function, the contrastive loss function finally adopted in model training may be referred to as a total contrastive loss function.

Specifically, a triple on which the total contrastive loss function is based includes: a document representation, a positive summary representation and a negative summary representation. A training objective of the total contrastive loss function based on the triple is sample representations with strong semantic relevance being close in distance, and sample representations with weak semantic relevance being far in distance. In this way, during prediction (i.e., a summary of a document is generated using a model), even if there are some fluctuations in the generated summary caused by noise, the model may generate a summary with good semantic relevance because semantically unrelated texts are far away from each other.

Figure 3:
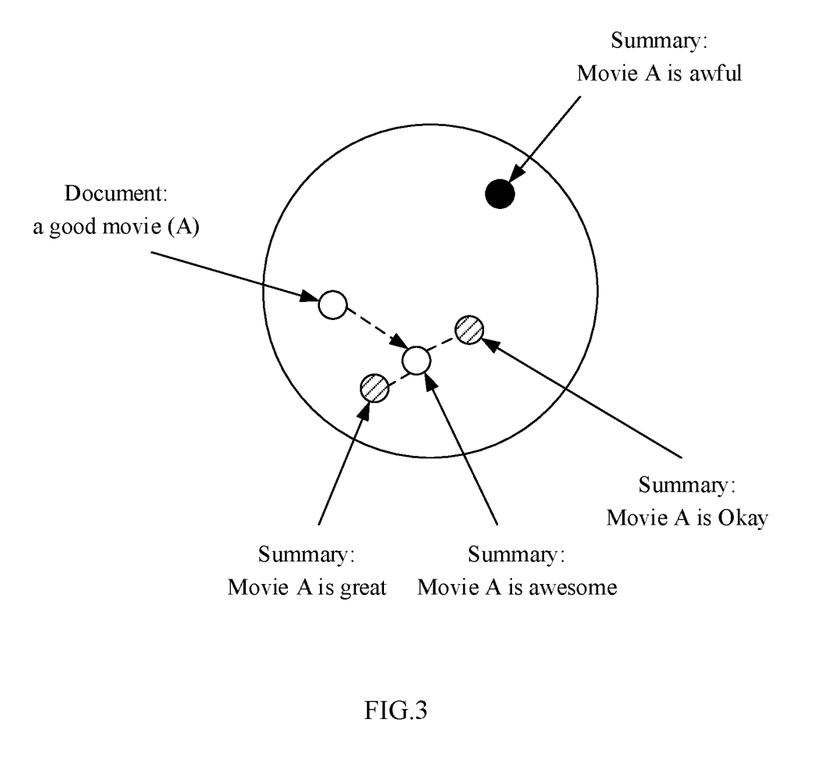
FIG. 3 is a schematic diagram of a third embodiment according to the present disclosure.

As shown in FIG. 3, assuming that a document is a review document about a movie A and the review document indicates a good movie (A), ideally, a summary (Movie A is great) corresponding to the review document may be represented by a white dot. Even in the presence of noise, the generated summary ("Movie A is awesome" or "The movie is Okay") may be represented by a slash filled dot. However, since the semantically unrelated texts are far away from each other in model training, semantically unrelated summaries may not be generated. For example, a summary (The movie is awful) represented by a black dot may not be generated. It may be understood that, to simplify the illustration, the dots in FIG. 3 are represented in a mainfold space.

A triple-based total contrastive loss function may be constructed based on the triple. Then, the summary generation model may be trained based on the total contrastive loss function. That is, model parameters may be adjusted based on the total contrastive loss function until the total contrastive loss function converges.

In this embodiment, a total contrastive loss function is constructed based on the document representation, the positive summary representation corresponding to the document representation and the negative summary representation corresponding to the document representation, and the summary generation model is trained based on the total contrastive loss function, so that contractive learning is introduced in model training, which improves the accuracy of the summary generation model.

As shown in FIG. 2, in the summary generation model, input is one type of text (document) and output is another type of text (summary). Therefore, the summary generation model may be a seq2seq model. The seq2seq model generally includes an encoder and a decoder.

Figure 4:
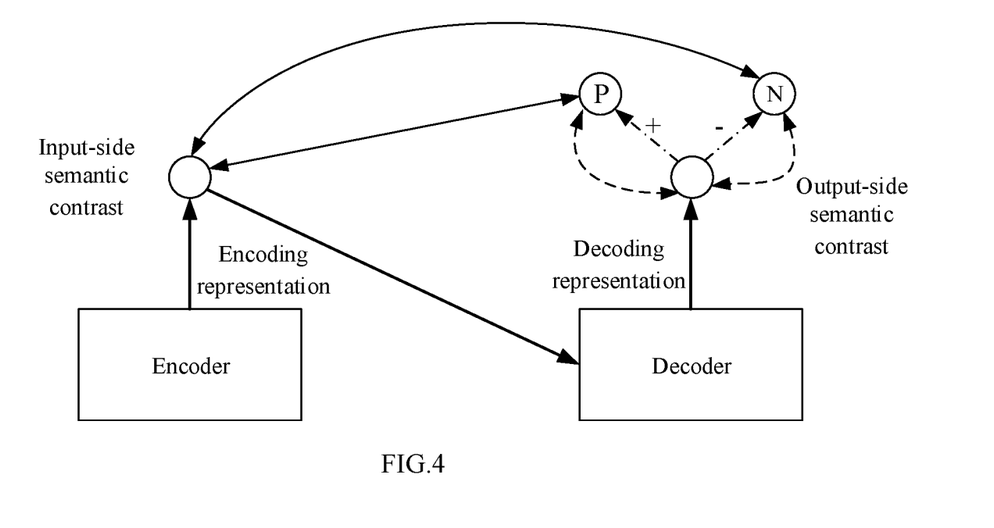
FIG. 4 is a schematic diagram of a fourth embodiment according to the present disclosure.

As shown in FIG. 4, for example, the summary generation model includes an encoder and a decoder. In the application stage, a document is inputted to the encoder, the encoder processes the document, an encoding representation is obtained, the encoding representation may be then inputted to the decoder and processed by the decoder, a decoding representation is obtained, and a text corresponding to the decoding representation may be acquired by table lookup based on the decoding representation as a summary corresponding to the document. The seq2seq model including an encoder and a decoder may be of a model structure in the related art, such as a transformer model. In a training stage, the inputted document may be referred to as a document sample. An encoding representation and/or a decoding representation corresponding to the document sample may be taken as the document representation.

Obtaining a document representation based on an encoder and a decoder may be applied to seq2seq model scenarios.

Figure 5:
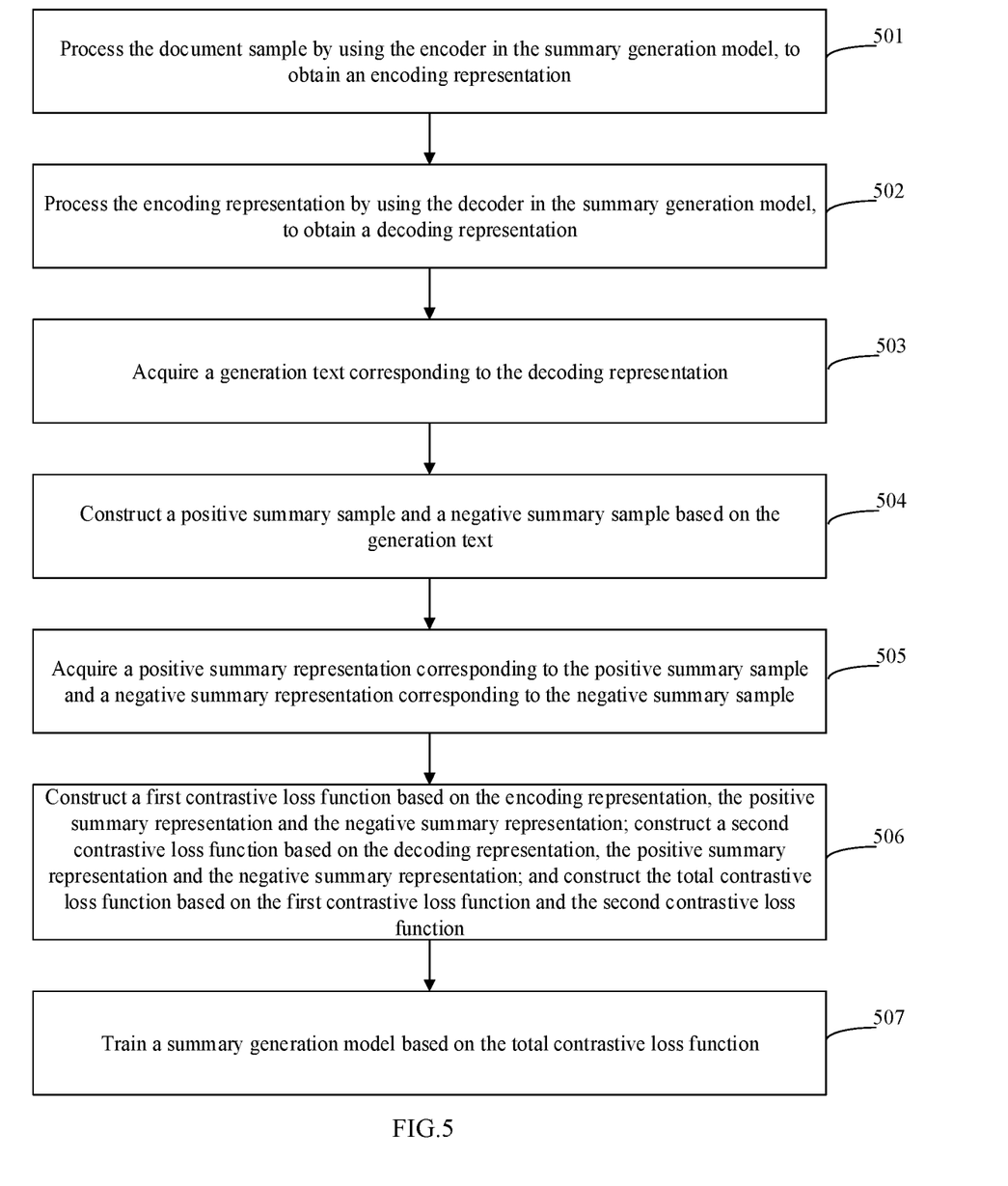
FIG. 5 is a schematic diagram of a fifth embodiment according to the present disclosure.

FIG. 5 is a schematic diagram of a fifth embodiment according to the present disclosure. This embodiment provides a summary generation model training method. In conjunction with the structure shown in FIG. 4, the method may include the following steps:

In 501, the document sample is processed by using the encoder in the summary generation model, to obtain an encoding representation.

In 502, the encoding representation is processed by using the decoder in the summary generation model, to obtain a decoding representation.

The encoder and the decoder may be the encoder and the decoder in the seq2seq model in the related art. The seq2seq model is, for example, a transformer model.

In 503, a generation text corresponding to the decoding representation is acquired.

The decoding representation is generally a multi-dimensional vector, and a table of correspondences between vectors and texts may be pre-configured. A text corresponding to the decoding representation may be obtained as the generation text by looking up the table.

In 504, a positive summary sample and a negative summary sample are constructed based on the generation text.

The positive summary sample may be obtained by loopback translation.

That is, loopback translation may be performed on the generation text to obtain a loopback translation result, and the loopback translation result is taken as the positive summary sample.

For example, if the generation text is Chinese 1, Chinese 1 is correspondingly translated into English 0 by using a translator, and English 0 is correspondingly translated into Chinese 2 by using the translator, Chinese 2 is a loopback translation result of Chinese 1. That is, Chinese 2 may be taken as a positive summary sample of Chinese 1.

Syntactically different but semantically consistent positive summary samples may be constructed by loopback translation.

The negative summary sample may be obtained by using one or more of the following.

(1) Entity replacement is performed on the generation text to obtain an entity replacement result, and the entity replacement result is taken as the negative summary sample.

For example, if the generation text includes a geographical-name entity "Beijing", geographical-name entity "Beijing" may be replaced with another geographical-name entity, such as "Tianjin", so as to construct an error in an entity relationship, and the replaced text including "Tianjin" is taken as the negative summary sample.

(2) Pronoun replacement is performed on the generation text to obtain a pronoun replacement result, and the pronoun replacement result is taken as the negative summary sample.

For example, if the generation text includes a personal pronoun "he", it may be replaced with "she", so as to construct an error in the personal pronoun, and the replaced text including "she" is taken as the negative summary sample.

(3) Emotion replacement is performed on the generation text to obtain an emotion replacement result, and the emotion replacement result is taken as the negative summary sample.

For example, a positive statement is replaced with a negative statement. Specifically, "yes" in a text is replaced with "no", so as to construct an emotional error. The replaced text including "no" is taken as the negative summary sample.

(4) A similar text of the generation text is acquired, and the similar text is taken as the negative summary sample.

The similar text may refer to a text strongly similar to the generation text. Specifically, similarities between the generation texts and existing candidate texts may be calculated, and a candidate text with the highest similarity (top-1) or N (N may be set) (top-N) candidate texts with higher similarities may be taken as the negative summary sample(s).

(5) Virtual adversarial processing is performed on the generation text to obtain a virtual adversarial result, and the virtual adversarial result is taken as the negative summary sample.

Virtual adversarial is a data enhancement technology. A key step of virtual adversarial is to add disturbance to input to enable output of a model to be different from that of undisturbed input. In this embodiment, disturbance may be added to the representation corresponding to the generation text by virtual adversarial, and the representation to which disturbance is added is taken as a negative summary representation.

A strong negative summary sample with factual errors and not easily distinguishable on the surface may be constructed through the above negative summary sample construction technology, thereby effectively improving model performance A number of samples may be enriched by constructing the positive summary sample and the negative summary sample based on the generation text, thereby improving a model effect.

In 505, a positive summary representation corresponding to the positive summary sample and a negative summary representation corresponding to the negative summary sample are acquired.

Taking the positive summary sample as an example, the positive summary sample may be converted to a corresponding vector form by using a word2vec model or other text-to-vector conversion models, to serve as the positive summary representation. The negative summary representation may also be acquired in a similar manner.

In 506, a first contrastive loss function is constructed based on the encoding representation, the positive summary representation and the negative summary representation; a second contrastive loss function is constructed based on the decoding representation, the positive summary representation and the negative summary representation; and the total contrastive loss function is constructed based on the first contrastive loss function and the second contrastive loss function.

As shown in FIG. 4, the positive summary representation is represented by P, and the negative summary representation is represented by N. In this embodiment, two semantic contrasts are included, of which one may be referred to as an input-side semantic contrast and the other may be referred to as an output-side semantic contrast. A contrast triplet of the input-side semantic contrast includes an encoding representation, a positive summary representation and a negative summary representation. A contrast triplet of the output-side semantic contrast includes a decoding representation, a positive summary representation and a negative summary representation.

A specific form of the contrastive loss function may be set as required, and one calculation formula may be as follows:

$$l_1 = -\log \frac{\exp(sim(z_0, z_1)/\tau)}{\sum_{k=1}^{n} \exp(sim(z_0, z_k)/\tau)}$$

$$l_2 = -\log \frac{\exp(sim(z'_0, z_1)/\tau)}{\sum_{k=1}^{n} \exp(sim(z'_0, z_k)/\tau)}$$

$$L = l_1 + l_2$$

L denotes the total contrastive loss function, $l_1$ denotes the first contrastive loss function, $l_2$ denotes the second contrastive loss function, $z_0$ denotes the encoding representation, $z'_0$ denotes the decoding representation, $z_1$ denotes the positive summary representation, $z_2$ denotes the negative summary representation, n denotes a total number of negative summary representations, and $\tau$ denotes a preset hyper-parameter.

Factual consistency between the decoding representation and the encoding representation may be learned through the input-side semantic contrast. That is, if one encoding representation and a plurality of decoding representations are given, the model may learn to give a greater similarity for correctly matched decoding representations and a smaller similarity for mismatched decoding representations. Similarities between output representations may be learned through the output-side semantic contrast. That is, similarities between positive summary representations having factual consistency with the decoding representation are greater, while similarities between positive summary representations and negative summary representations are smaller.

In 507, a summary generation model is trained based on the total contrastive loss function.

For example, parameters of the summary generation model are adjusted using the total contrastive loss function until the total contrastive loss function converges or reaches a preset number of iterations.

In this embodiment, through the two semantic contrasts, a phenomenon that the summary generation model generates summaries with factual errors may be alleviated, which is more faithful to the original text and guarantees the quality of generation compared with summaries generated by an ordinary seq2seq model. In addition, when the summary generation model according to this embodiment is adopted, there is no need to pre-process and post-process document samples during training and documents during prediction, which may improve the efficiency of training or prediction.

Figure 6:
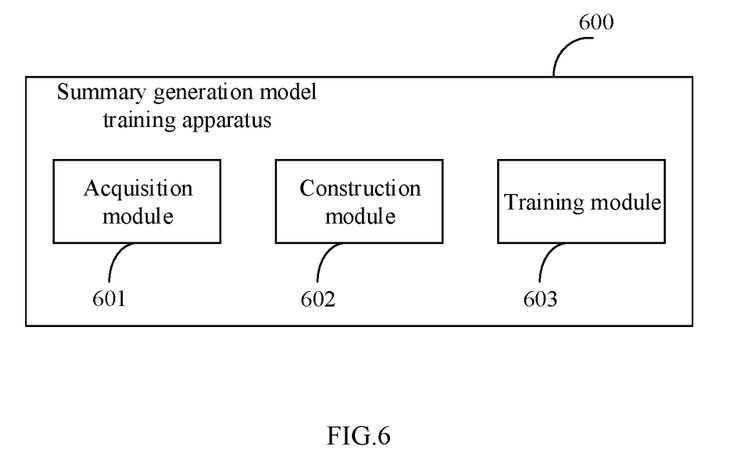
FIG. 6 is a schematic diagram of a sixth embodiment according to the present disclosure.

FIG. 6 is a schematic diagram of a sixth embodiment according to the present disclosure. This embodiment provides a summary generation model training apparatus. As shown in FIG. 6, the summary generation model training apparatus 600 includes: an acquisition module 601, a construction module 602, and a training module 603.

The acquisition module 601 is configured to acquire a document representation corresponding to a document sample. The construction module 602 is configured to construct, based on the document representation, a summary representation corresponding to the document representation, the summary representation including a positive summary representation and a negative summary representation. The training module 603 is configured to construct a total contrastive loss function based on the document representation, the positive summary representation and the negative summary representation, and train a summary generation model based on the total contrastive loss function.

In some embodiments, the summary generation model includes: an encoder and a decoder, and the acquisition module 601 is specifically configured to: process the document sample by using the encoder, to obtain an encoding representation; process the encoding representation by using the decoder, to obtain a decoding representation; and take the encoding representation or the decoding representation as the document representation.

In some embodiments, the document representation includes the encoding representation and the decoding representation, and the training module 603 is specifically configured to: construct a first contrastive loss function based on the encoding representation, the positive summary representation and the negative summary representation; construct a second contrastive loss function based on the decoding representation, the positive summary representation and the negative summary representation; and construct the total contrastive loss function based on the first contrastive loss function and the second contrastive loss function.

In some embodiments, the document representation includes the decoding representation, and the construction module 602 is specifically configured to: acquire a generation text corresponding to the decoding representation; construct a positive summary sample and a negative summary sample based on the generation text; and acquire a positive summary representation corresponding to the positive summary sample and a negative summary representation corresponding to the negative summary sample.

In some embodiments, the construction module 602 is further specifically configured to: perform loopback translation on the generation text to obtain a loopback translation result, and take the loopback translation result as the positive summary sample.

In some embodiments, the construction module 602 is further specifically configured to perform at least one of the following: performing entity replacement on the generation text to obtain an entity replacement result, and taking the entity replacement result as the negative summary sample; performing pronoun replacement on the generation text to obtain a pronoun replacement result, and taking the pronoun replacement result as the negative summary sample; performing emotion replacement on the generation text to obtain an emotion replacement result, and taking the emotion replacement result as the negative summary sample; acquiring a similar text of the generation text, and taking the similar text as the negative summary sample; and performing virtual adversarial training on the generation text to obtain a virtual adversarial result, and taking the virtual adversarial result as the negative summary sample.

In this embodiment, a total contrastive loss function is constructed based on the document representation, the positive summary representation corresponding to the document representation and the negative summary representation corresponding to the document representation, and the summary generation model is trained based on the total contrastive loss function, so that contractive learning is introduced in model training, which improves the accuracy of the summary generation model.

It may be understood that the same or similar contents in different embodiments may be referred to each other in the embodiments of the present disclosure.

It may be understood that "first", "second" and the like in the embodiments of the present disclosure are intended only for differentiation, and do not indicate a degree of importance or sequence.

According to embodiments of the present disclosure, the present disclosure further provides an electronic device, a readable storage medium and a computer program product.

Figure 7:
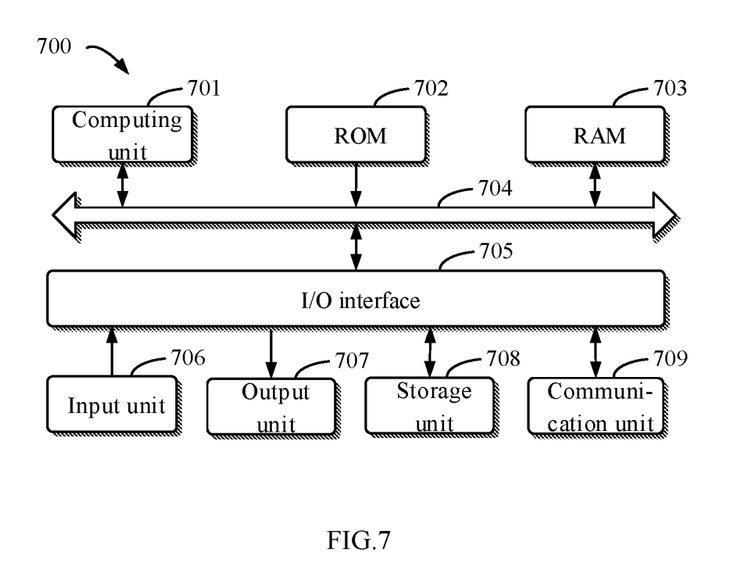
FIG. 7 is a schematic diagram of an electronic device configured to perform any one of the summary generation model training methods according to embodiments of the present disclosure.

FIG. 7 is a schematic block diagram of an exemplary electronic device 700 configured to perform embodiments of the present disclosure. The electronic device is intended to represent various forms of digital computers, such as laptops, desktops, workbenches, personal digital assistants, servers, blade servers, mainframe computers and other suitable computing devices. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or required herein.

As shown in FIG. 7, the electronic device 700 includes a computing unit 701, which may perform various suitable actions and processing according to a computer program stored in a read-only memory (ROM) 702 or a computer program loaded from a storage unit 708 into a random access memory (RAM) 703. The RAM 703 may also store various programs and data required to operate the electronic device 700. The computing unit 701, the ROM 702 and the RAM 703 are connected to one another by a bus 704. An input/output (I/O) interface 705 is also connected to the bus 704.

A plurality of components in the electronic device 700 are connected to the I/O interface 705, including an input unit 706, such as a keyboard and a mouse; an output unit 707, such as various displays and speakers; a storage unit 708, such as disks and discs; and a communication unit 709, such as a network card, a modem and a wireless communication transceiver. The communication unit 709 allows the electronic device 700 to exchange information/data with other devices over computer networks such as the Internet and/or various telecommunications networks.

The computing unit 701 may be a variety of general-purpose and/or special-purpose processing components with processing and computing capabilities. Some examples of the computing unit 701 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 701 performs the methods and processing described above, such as the summary generation model training method. For example, in some embodiments, the summary generation model training method may be implemented as a computer software program that is tangibly embodied in a machine-readable medium, such as the storage unit 708. In some embodiments, part or all of a computer program may be loaded and/or installed on the electronic device 700 via the ROM 702 and/or the communication unit 709. One or more steps of the summary generation model training method described above may be performed when the computer program is loaded into the RAM 703 and executed by the computing unit 701. Alternatively, in other embodiments, the computing unit 701 may be configured to perform the summary generation model training method described in the present disclosure by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a load programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, a random access memory (RAM), a read-only memory (ROM), an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and a virtual private server (VPS). The server may also be a distributed system server, or a server combined with blockchain.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the extent of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the extent of protection of the present disclosure.

What is claimed is:

1. A computer-implemented summary generation model training method, wherein the summary generation model is configured to process a document to obtain a summary corresponding to the document, the method comprising:
   acquiring a document representation corresponding to a document sample, the document representation describing data in a vector form;
   constructing, based on the document representation, a summary representation corresponding to the document representation, the summary representation comprising a positive summary representation and a negative summary representation; and
   constructing a total contrastive loss function based on the document representation, the positive summary representation and the negative summary representation, and training a summary generation model based on the total contrastive loss function,
   wherein the summary generation model comprises: an encoder and a decoder, and the step of acquiring a document representation corresponding to a document sample comprises:
      processing the document sample by using the encoder, to obtain an encoding representation;
      processing the encoding representation by using the decoder, to obtain a decoding representation; and
      taking the encoding representation and the decoding representation as the document representation,
   wherein the document representation comprises the encoding representation and the decoding representation, and the step of constructing a total contrastive loss function based on the document representation, the positive summary representation and the negative summary representation comprises:
      constructing a first contrastive loss function based on the encoding representation, the positive summary representation and the negative summary representation;
      constructing a second contrastive loss function based on the decoding representation, the positive summary representation and the negative summary representation; and
      constructing the total contrastive loss function based on the first contrastive loss function and the second contrastive loss function,
   wherein the positive summary representation refers to a representation of the positive summary sample corresponding to the document sample, the negative summary representation refers to a representation of the negative summary sample corresponding to the document sample, and the positive summary sample and the negative summary sample are constructed based on a generation text corresponding to the decoding representation.

2. The method according to claim 1, wherein the step of constructing a positive summary sample comprises:
   performing loopback translation on the generation text to obtain a loopback translation result, and taking the loopback translation result as the positive summary sample.

3. The method according to claim 1, wherein the step of constructing a negative summary sample comprises at least one of the following:
   performing entity replacement on the generation text to obtain an entity replacement result, and taking the entity replacement result as the negative summary sample;
   performing pronoun replacement on the generation text to obtain a pronoun replacement result, and taking the pronoun replacement result as the negative summary sample;
   performing emotion replacement on the generation text to obtain an emotion replacement result, and taking the emotion replacement result as the negative summary sample;
   acquiring a similar text of the generation text, and taking the similar text as the negative summary sample; and
   performing virtual adversarial training on the generation text to obtain a virtual adversarial result, and taking the virtual adversarial result as the negative summary sample.

4. An electronic device, comprising:
   at least one processor; and
   a memory communicatively connected with the at least one processor;
   wherein the memory stores instructions executable by the at least one processor, and the instructions are executed by the at least one processor to enable the at least one processor to perform a summary generation model training method, wherein the summary generation model is configured to process a document to obtain a summary corresponding to the document, and the summary generation model training method comprises:

acquiring a document representation corresponding to a document sample, the document representation describing data in a vector form;

constructing, based on the document representation, a summary representation corresponding to the document representation, the summary representation comprising a positive summary representation and a negative summary representation; and constructing a total contrastive loss function based on the document representation, the positive summary representation and the negative summary representation, and training a summary generation model based on the total contrastive loss function, wherein the summary generation model comprises: an encoder and a decoder, and the step of acquiring a document representation corresponding to a document sample comprises:

processing the document sample by using the encoder, to obtain an encoding representation;

processing the encoding representation by using the decoder, to obtain a decoding representation; and taking the encoding representation and the decoding representation as the document representation, wherein the document representation comprises the encoding representation and the decoding representation, and the step of constructing a total contrastive loss function based on the document representation, the positive summary representation and the negative summary representation comprises:

constructing a first contrastive loss function based on the encoding representation, the positive summary representation and the negative summary representation;

constructing a second contrastive loss function based on the decoding representation, the positive summary representation and the negative summary representation; and constructing the total contrastive loss function based on the first contrastive loss function and the second contrastive loss function, wherein the positive summary representation refers to a representation of the positive summary sample corresponding to the document sample, the negative summary representation refers to a representation of the negative summary sample corresponding to the document sample, and the positive summary sample and the negative summary sample are constructed based on a generation text corresponding to the decoding representation.

5. The electronic device according to claim 4, wherein the step of constructing a positive summary sample comprises:

performing loopback translation on the generation text to obtain a loopback translation result, and taking the loopback translation result as the positive summary sample.

6. The electronic device according to claim 4, wherein the step of constructing a negative summary sample comprises at least one of the following:

performing entity replacement on the generation text to obtain an entity replacement result, and taking the entity replacement result as the negative summary sample;

performing pronoun replacement on the generation text to obtain a pronoun replacement result, and taking the pronoun replacement result as the negative summary sample;

performing emotion replacement on the generation text to obtain an emotion replacement result, and taking the emotion replacement result as the negative summary sample;

acquiring a similar text of the generation text, and taking the similar text as the negative summary sample; and performing virtual adversarial training on the generation text to obtain a virtual adversarial result, and taking the virtual adversarial result as the negative summary sample.

7. A non-transitory computer readable storage medium with computer instructions stored thereon, wherein the computer instructions are used for causing a computer to perform a summary generation model training method, wherein the summary generation model is configured to process a document to obtain a summary corresponding to the document, and the summary generation model training method comprises:

acquiring a document representation corresponding to a document sample, the document representation describing data in a vector form;

constructing, based on the document representation, a summary representation corresponding to the document representation, the summary representation comprising a positive summary representation and a negative summary representation; and constructing a total contrastive loss function based on the document representation, the positive summary representation and the negative summary representation, and training a summary generation model based on the total contrastive loss function, wherein the summary generation model comprises: an encoder and a decoder, and the step of acquiring a document representation corresponding to a document sample comprises:

processing the document sample by using the encoder, to obtain an encoding representation;

processing the encoding representation by using the decoder, to obtain a decoding representation; and taking the encoding representation and the decoding representation as the document representation, wherein the document representation comprises the encoding representation and the decoding representation, and the step of constructing a total contrastive loss function based on the document representation, the positive summary representation and the negative summary representation comprises:

constructing a first contrastive loss function based on the encoding representation, the positive summary representation and the negative summary representation;

constructing a second contrastive loss function based on the decoding representation, the positive summary representation and the negative summary representation; and constructing the total contrastive loss function based on the first contrastive loss function and the second contrastive loss function, wherein the positive summary representation refers to a representation of the positive summary sample corresponding to the document sample, the negative summary representation refers to a representation of the negative summary sample corresponding to the document sample, and the positive summary sample and the negative summary sample are constructed based on a generation text corresponding to the decoding representation.

8. The non-transitory computer readable storage medium according to claim 7, wherein the step of constructing a positive summary sample comprises:
   performing loopback translation on the generation text to obtain a loopback translation result, and taking the loopback translation result as the positive summary sample.

9. The non-transitory computer readable storage medium according to claim 7, wherein the step of constructing a negative summary sample comprises at least one of the following:
   performing entity replacement on the generation text to obtain an entity replacement result, and taking the entity replacement result as the negative summary sample;
   performing pronoun replacement on the generation text to obtain a pronoun replacement result, and taking the pronoun replacement result as the negative summary sample;
   performing emotion replacement on the generation text to obtain an emotion replacement result, and taking the emotion replacement result as the negative summary sample;
   acquiring a similar text of the generation text, and taking the similar text as the negative summary sample; and
   performing virtual adversarial training on the generation text to obtain a virtual adversarial result, and taking the virtual adversarial result as the negative summary sample.

* * * * *